April 16, 1957  W. R. WEEKS  2,788,734
ADJUSTABLE SLOT TOASTER
Filed March 25, 1954  3 Sheets-Sheet 1
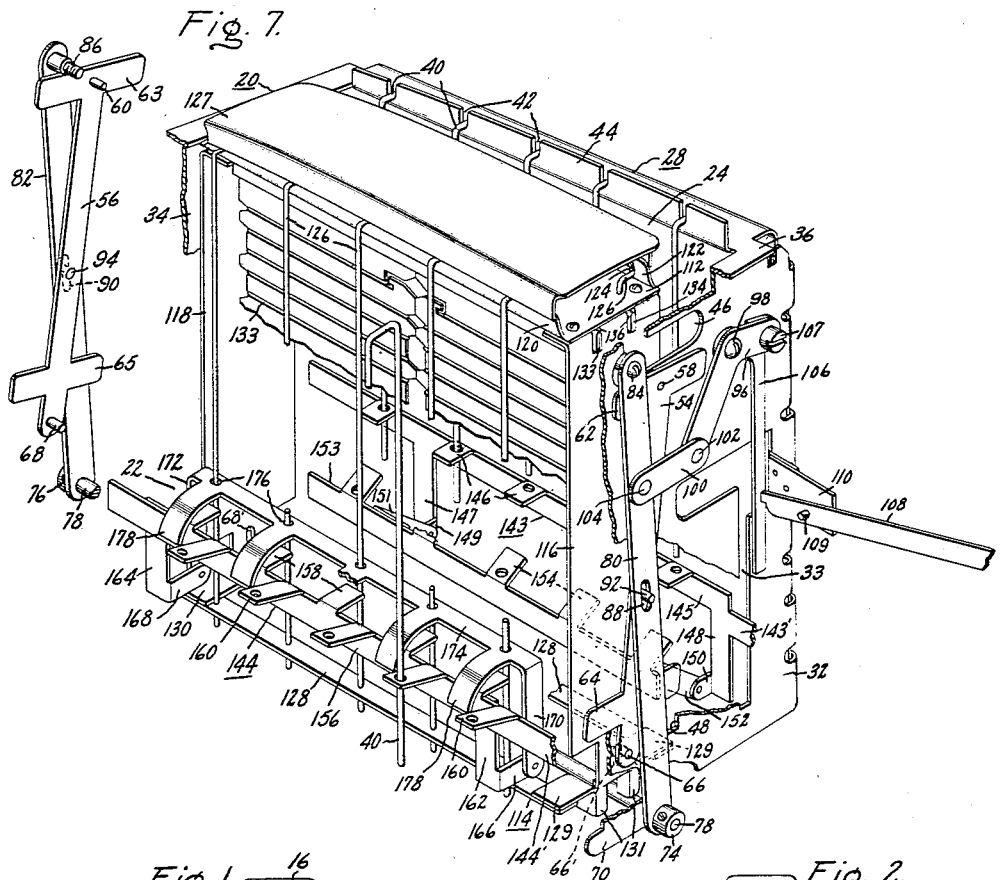
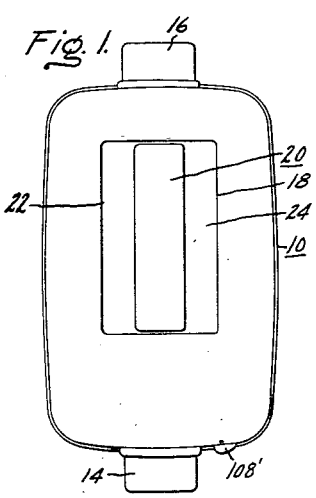
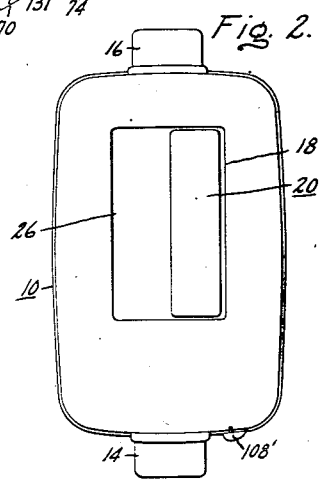
Inventor:
Walter R. Weeks,
by Frank L. Neuhauser
His Attorney.

April 16, 1957  W. R. WEEKS  2,788,734
ADJUSTABLE SLOT TOASTER
Filed March 25, 1954  3 Sheets-Sheet 2
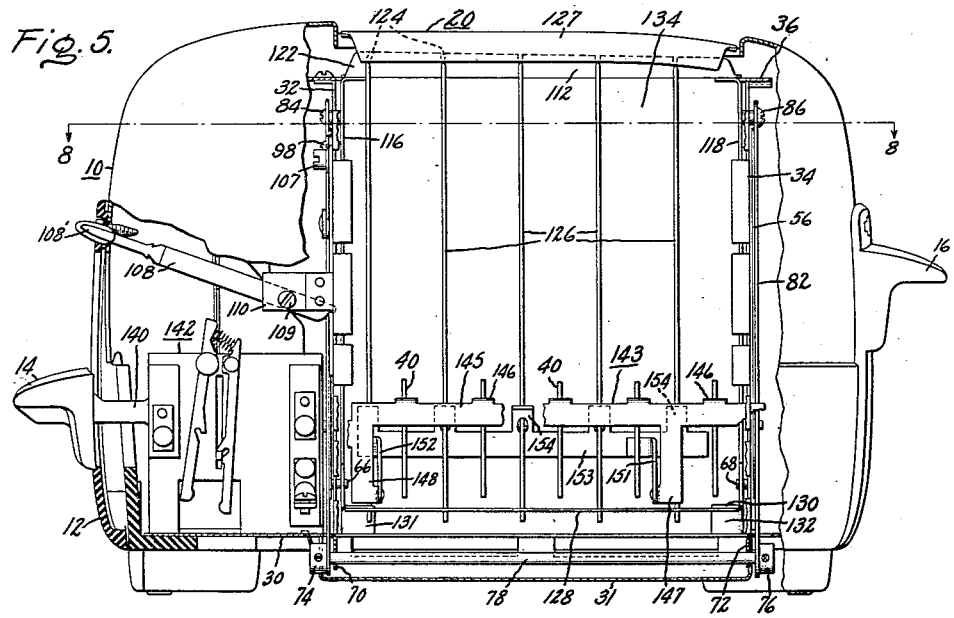
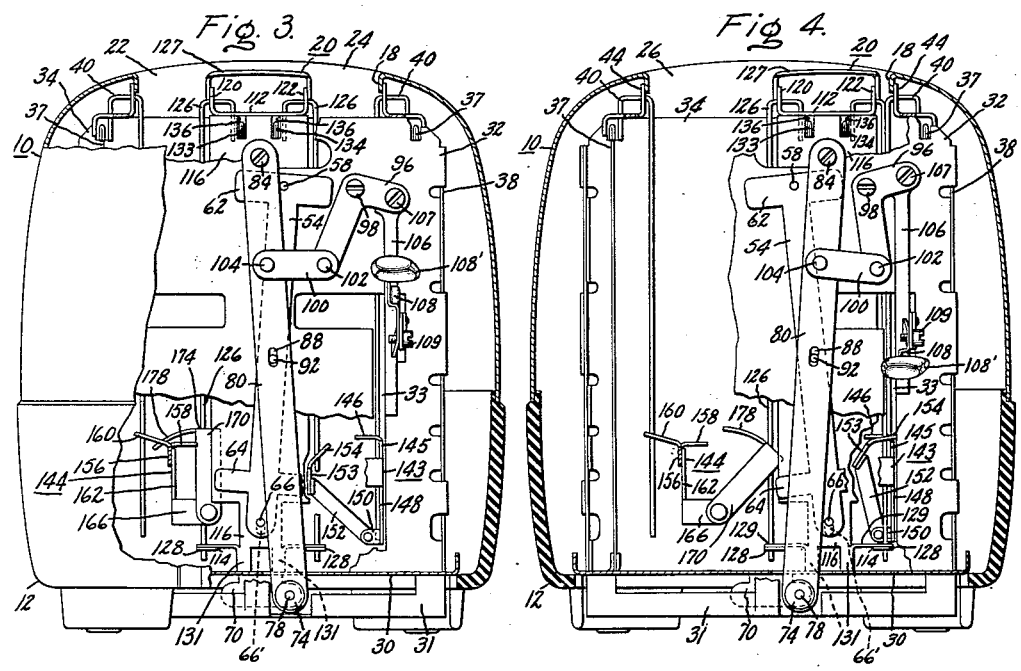
Inventor:
Walter R. Weeks,
by Frank L. Neuhauser
His Attorney.

April 16, 1957 W. R. WEEKS 2,788,734
ADJUSTABLE SLOT TOASTER
Filed March 25, 1954 3 Sheets-Sheet 3

Inventor:
Walter R. Weeks,
by Frank L. Neuhauser
His Attorney.

United States Patent Office 2,788,734
Patented Apr. 16, 1957

2,788,734

ADJUSTABLE SLOT TOASTER

Walter R. Weeks, Louisville, Ky., assignor to General Electric Company, a corporation of New York Application March 25, 1954, Serial No. 418,728

18 Claims. (Cl. 99—390)

My invention relates to cooking, toasting or heating appliances, and more particularly to a means for properly positioning objects of various sizes to be cooked, toasted or heated in such appliances. For clarity and simplicity, the invention will be described as being incorporated in a toaster.

Most toasters on the market today are designed primarily to toast slices of bread. These toasters usually include open slots, accessible from the top of the toaster, into which the bread slices are inserted. The slots are designed primarily to accommodate bread slices, and since most commercially available, sliced breads come in slice thicknesses falling within the range of .25 inch to .60 inch, most of the available toasters cannot toast objects that are thicker than .70 inch. When it is desired to warm or toast objects having a thickness in excess of .70 inch, such as English muffins, hamburger buns, rolls and the like, most commercially available toasters are unable to satisfy this desire.

It is an object of this invention to provide a toaster wherein objects having thicknesses that fall within the range of the thinnest commercially available sliced bread (approximately .25 inch to that of a whole English muffin or hamburger bun (approximately 1.50 inches) may be toasted.

The above object and others are obtained by making the portion of the toaster between the two bread slice slots of a conventional toaster laterally adjustable, so as to permit conversion of the toaster from one having two conventional bread slice slots to one having a single toasting slot that is approximately double the width of either of the two original toasting slots, by lateral movement of said portion.

Other objects and details of that which I believe to be novel and my invention will be clear from the following description and claims taken with the accompanying drawings in which is shown an example of a toaster embodying the present invention and incorporating my novel, adjustable slot arrangement.

Figure 1 is a plan view of a toaster incorporating my invention, showing its parts positioned to provide two bread slide receiving slots.

Figure 2 is a plan view of the toaster shown in Figure 1 after the parts have been adjusted to provide a single toasting slot of substantially twice the width of either of the original bread slice receiving slots shown in Figure 1.

Figure 3 is an end elevation with portions broken away of a toaster having its parts positioned as shown in Figure 1.

Figure 4 is an end elevation with portions broken away of a toaster having its parts positioned as shown in Figure 2.

Figure 5 is a side elevation with portions broken away.

Figure 7 is a perspective view with portions broken away of the toasting chamber, the toasting chamber divider, and the control means therefor; some of the parts in this view are separated and shown by themselves for clarity.

Figure 6:
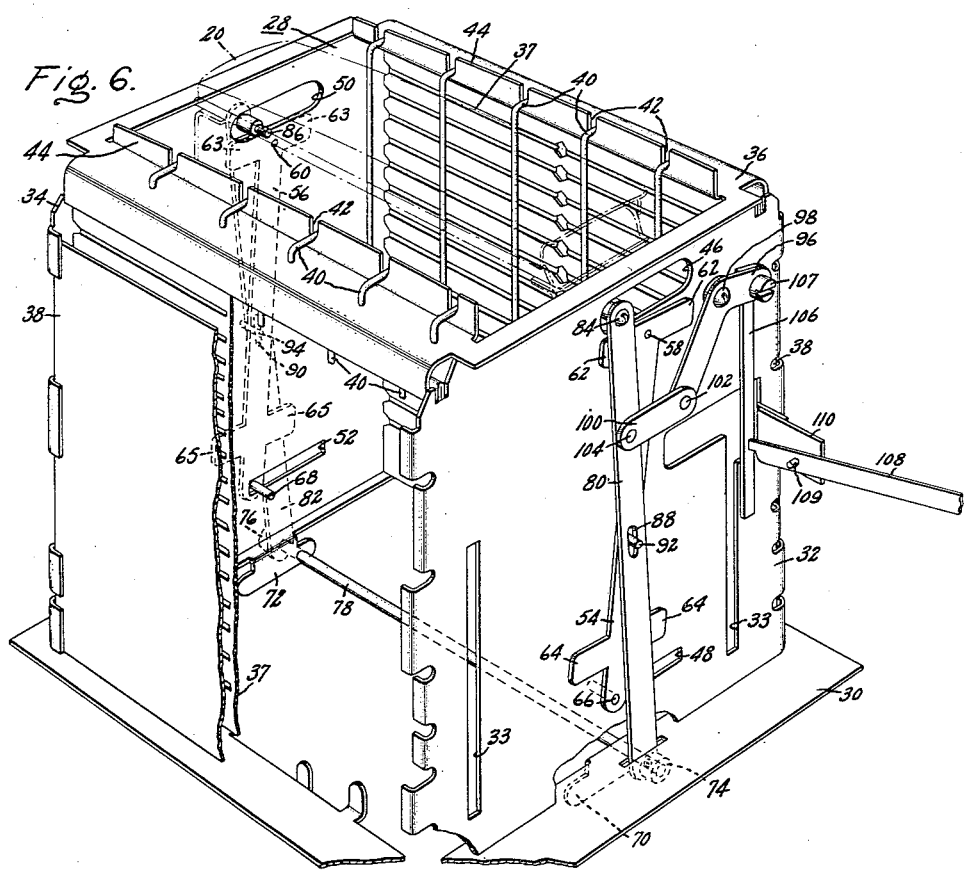
Figure 6 is a perspective view of the toasting chamber.

The toaster shown in the drawing has an outer shell or casing 10, and may be provided with a base 12, and handles 14 and 16. In the top of the casing 10, there is provided an opening 18 of substantial size which generally outlines the open top of a toasting chamber which will be described in greater detail subsequently. In Figure 1, it will be seen that the toasting chamber houses a toasting chamber divider 20 which divides the toasting chamber into two conventionally sized toasting slots 22 and 24, when it is positioned centrally of the opening 18. As used throughout this specification, the term "toasting slot" is intended to be the equivalent of "toasting space," i. e., a volume of space into which an object to be toasted may be inserted.

Divider 20 comprises a vertical wall that is mounted in the toasting chamber so as to be movable from the position shown in Figure 1, wherein it is positioned midway of the opening 18 and provides two bread slice receiving slots 22 and 24, to the position shown in Figure 2, wherein a single enlarged toasting slot 26 is provided. It should be realized, however, that divider 20 may be adjusted to any position within the limits of the two extreme positions shown in Figure 1 and Figure 2, and thereby produce two slots of unequal size; this permits the formation of one toasting slot thinner and the other thicker than either of the two original slots.

The toasting chamber which houses divider 20 is shown in Figure 6 removed from the other toaster structure. The toasting chamber is designated generally by reference numeral 28, and comprises a base plate 30, end plates 32 and 34, and top plate 36. Base plate 30 is secured to the base 12 in a conventional manner, and the entire toasting chamber assembly is covered by the casing 10. The base and top plates have central, rectangular openings that are aligned with the opening 18 in the casing 10 when the parts are assembled. The opening in the base plate is closed by crumb catcher 31, which is removably secured to the underside of base plate 30 in a conventional manner. Each of the open sides of the toasting chamber 28 is closed by a conventional heating element 37 and reflector plate 38, that are secured to the sides of end plates 32 and 34 in a conventional manner. From Figure 6 it will be seen that the heating elements 37 are positioned inwardly of the reflector plates 38, and have protective guards positioned immediately inwardly thereof, which are formed by a plurality of hooked wires 40 that are received in slots 42 that are formed in upwardly bent wall portions 44 of the top plate 36.

End wall 32 has parallel, vertical slots 33, an upper horizontally disposed slot 46 and a lower horizontally disposed slot 48 formed therein. One lateral edge of each of the slots 46 and 48 is disposed in a vertical, longitudinal plane that passes midway through the end wall 32; the remainder of slots 46 and 48 extend toward one side of the end wall (to the right in Figure 6). End wall 34 has a horizontal upper slot 50 and lower slot 52 formed therein which correspond to the slots 46 and 48. Generally I-shaped links 54 and 56 are contiguous with and pivotally secured to the end walls 32 and 34, respectively. The pivotal connections are made by pivot pins 58 and 60 which are secured to the upper portions of the links 54 and 56, respectively, and pivotally received in the end walls 32 and 34, respectively, at points immediately below the upper horizontal slots 46 and 50, respectively. Each of the links 54 and 56 has a pair of lateral oppositely extending upper projections (pair 62 and pair 63, respectively) a pair of lateral, oppositely extending lower projections (pair 64 and pair 65, respectively) and inwardly extending pins 66 and 68, respectively, secured near their lower ends, which pass through lower horizontal slots 48 and 52, respectively.

Base plate 30 has depending tabs 70 and 72 formed thereon, which support portions of rod 78 adjacent to the ends thereof for rotational movement therein. Adjacent to each I-shaped link 54 and 56 is positioned an elongated link, designated 80 and 82, respectively, which is longer than its associated I-shaped link. The lower portion of the links 80 and 82 have secured thereto bushings 74 and 76, respectively, which are in turn secured to the ends of rod 78. Links 80 and 82, and rod 78 are adapted to pivot jointly about an axis that passes through the axis of rod 78. The upper portion of the links 80 and 82 have opposed, inwardly directed pins 84 and 86, respectively, formed thereon that pass through the upper horizontal slots 46 and 50, respectively. As employed throughout the specification, the term "pin" is intended to include but not be limited to a screw, rivet or constructions such as pivot screw arrangements 84 and 86 shown in the drawings (see particularly Figure 8) which comprise a headed screw and a spacer bushing. In each instance where from the context it is clear that the "pin" connects two relatively pivotal parts, it should be understood that the precise construction and manner of attachment is purely a matter of manufacturing and assembling technique, it being only necessary that the pivotal relationship obtain. Formed centrally of the links 80 and 82 are slots 88 and 90, respectively, which are adapted to slidably receive pins 92 and 94, respectively, which are secured to I-shaped links 54 and 56, respectively, for a purpose to become apparent subsequently.

L-shaped lever 96 is pivotally secured to the end wall 32 by pin 98, and has one of its ends pivotally secured to link 100 by pin 102, and the other of its ends pivotally secured to the upper end of the bar 106 by pin 107. Link 100 is pivotally secured at its other end by pin 104 to the link 80 at a point substantially midway between the slot 88 and the upper end of the link 80. The lower end of bar 106 is flexibly connected to the inner end of the control rod 108, which is pivotally secured by pin 109 to tab 110, which projects from the end wall 32. The outer end of control rod 108 passes through an appropriate opening in the casing 10 and has a knob 108' mounted at its extremity which is accessible from the exterior of the toaster.

Divider 20, which is positioned within the toasting chamber just described, is partially shown in phantom lines in Figure 6, and more completely shown in Figure 7, and generally comprises top wall 112, apertured bottom 114, and end walls 116 and 118. Lateral portions 120 and 122 of the top plate 112 are turned upwardly and have vertical slots 124 formed therein which are adapted to receive the upper hook portions of protective guard wires 126 in a conventional manner (see Figure 5). Cover plate 127 is mounted on turned up portions 120 and 122 of top wall 112 into assembled position, and in such position it locks the guard wires 126 in place. Bottom 114 comprises parallel side strips 128 and parallel tab portions 129 and 130 that are bent out of the end walls 116 and 118, respectively. The tab portions 129 and 130 have heating element receiving grooves 131 and 132, respectively, formed therein to receive the lower portions of heating elements 133 and 134, the upper portions of which are seated in slots 136 in the end wall 116 and similar slots (not shown) in end wall 118. Positioned between the heating elements 133 and 134 is a reflector (not shown) which is secured to the end walls 116 and 118 in any conventional manner.

Figure 8:
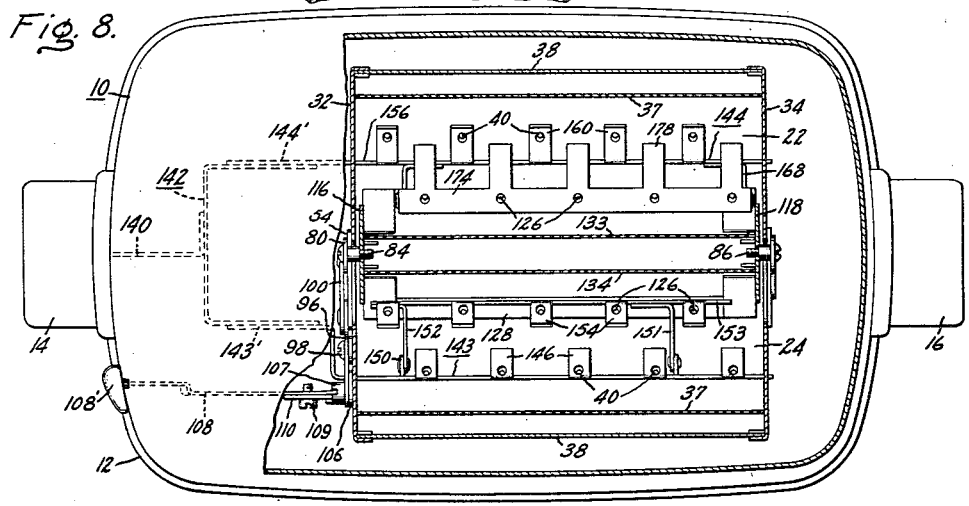
Figure 8 is a sectional view taken approximately on line 8—8 of Figure 5.

By reference to Figures 5 and 8, it will be seen that the handle 14 has connected thereto an inwardly extending bar 140, which is operatively connected to a conventional bread carriage control mechanism 142, which may or may not be of the automatic "pop up" variety. Since the specific construction of the control mechanism forms no part of my invention, it is not shown in detail. Operatively connected to control mechanism 142 are two parallel bread carriages indicated generally as 143 and 144, respectively, which have arms 143' and 144', respectively, that pass through slots 33 in end wall 32 and are connected to said control mechanism.

The structure of the bread carriages in each of the slots is different due to the fact that the bread carriage 144 in slot 22 must be capable of expanding (having its width increased) to cover the entire slot when the movable wall 20 is moved to the right (as viewed in Figures 3 and 4), and the bread carriage 143 in slot 24 must be capable of collapsing (having its width diminished) simultaneously. In order to understand the bread carriage construction, frequent reference to Figure 7 will be helpful, where it will be seen that the bread carriage 143, which must be capable of collapsing, comprises elongated main bar 145, which is operatively connected to control mechanism 142 by arm 143', and which has a plurality of apertured horizontal tabs 146 formed at its top edge, and depending legs 147 and 148 formed at its ends, said legs in turn having lateral tabs 149 and 150, respectively, formed thereon. Pivotally secured to these tabs are inclined legs 151 and 152, respectively, which form a part of the floating auxiliary bar 153, which is the other main part of bread carriage 143. Auxiliary bar 153 has inclined upwardly extending apertured tabs 154 formed thereon which oppose the tabs 146, and cooperate therewith to form a rack for a slice of bread or other object. Wires 40 on one side of the toasting slot 24 pass through the openings in the tabs 146, whereas wires 126 on the side of the movable wall 20 adjacent to the toasting slot 24 pass through the openings in the tabs 154. From the structure described so far, it will be observed that the bread carriage 143, comprising the main bar 145 and the auxiliary bar 153, is capable of collapsing as the movable wall 20 moves toward the right in Figures 3, 4 and 7. This occurs due to the action of bar 153, which is floatingly mounted on the wires 126, and which slides upwardly on the wires 126 and concurrently pivots about the tabs 149 and 150 until it assumes the position shown in Figure 4, wherein the carriage 143 is fully collapsed and the slot 24 has no effective width. It should be noted that the tabs 146 and 154 are out of alignment so that they clear each other when the carriage 143 is collapsed.

The bread carriage 144, which is positioned in slot 22 as shown in Figure 3, and which is capable of expanding to the position shown in Figure 4 to cover the complete single enlarged slot 26 therein, comprises main bar 156, which is operatively connected to control mechanism 142 through arm 144', and has tabs 158 extending in one direction from the top edge thereof and apertured tabs 160 extending in the opposite direction; main bar 156 has vertically depending legs 162 and 164 secured near its ends, which in turn have horizontally disposed, projecting portions 166 and 168, respectively, that are pivoted to legs 170 and 172, respectively, that depend from the floating auxiliary bar 174. It should be particularly noted that bar 174 has apertures 176 formed in the bar itself, and further that it has arcuately bent extensions 178 formed thereon. Protective guard wires 40 that are positioned in the slot 22 pass through the apertures in the tabs 160. Guard wires 126 that are positioned in the slot 22 pass through the apertures 176 in the floating auxiliary bar 174. By reference to Figures 3 and 4 it will be seen that the carriage structure that is positioned in the slot 22 (Figure 3) is capable of expanding to fill the enlarged slot 26 (Figure 4) as the result of pivotal motion between the legs 162 and 164 of the main bar 156, and the legs 170 and 172 of the floating auxiliary bar 174, respectively. It should be realized that the bread carriage structure in each of the slots 22 and 24 operates simultaneously to expand and contract in response to movement of the movable toasting chamber divider 20.

The lever and linkage control system which has been described in detail is physically connected to the divider 20 at the following points: the upper end of link 80 is pivotally connected to the upper portion of end wall 116 by the pivot pin 84, which is illustrated as being fixed to the end wall 116, freely movable in slot 46 and movably secured to link 80; pivot pin 66, which is secured to the lower end of I-link 54, passes through opening 48 in an end plate 32 and rides in slot 66′ formed in end wall 116; the upper portion of end wall 118 is pivotally connected to the upper end of link 82 by the pivot pin 86, which is illustrated as being fixed to end wall 118, freely movable in slot 50 and movably secured to link 82; pivot pin 68, which is secured to the lower end of I-link 56, passes through opening 52 in end plate 34 and rides in slot 68′ formed in end wall 118.

The operation of the lever and linkage control system is as follows: pressing the knob 108′ downwardly causes the control rod 103 to pivot about pin 109 and move the bar 106 upwardly thereby pivoting L-shaped lever 96 counterclockwise about its pivot pin 98 and causing the link 100 to move generally toward the right, as viewed in Figures 3, 4 and 7. Movement of the link 100 toward the right causes the link 80 to pivot clockwise about the axis that passes through the rod 78, which causes the upper portion of the divider 20 to move in an arcuate path toward the right, since the links 80 and 82 move in unison with the rod 78. Simultaneously, the I-links 54 and 56 are forced to pivot counterclockwise about their pivot points 58 and 60, respectively, by the driving connection of the pins 92 and 94 with their associated slots 88 and 90, respectively, thereby causing the lower portion of the divider 20 to move to the right; during this movement, pins 66 and 68 ride in slots 66′ and 68′, respectively, the total effect being that of causing the divider to move smoothly and uniformly. Throughout the operation of the linkage and lever system, the lateral projections 62, 63, 64 and 65 contribute to smooth sliding of the associated links on each other.

Movement of the knob 108′ upwardly has the reverse effect to that just described and causes the divider 20 to move toward the left. It should be clearly understood that divider 20 may be stopped at any of the intermediate positions between the extreme positions shown in Figures 3 and 4 by stopping the knob 108′ at any point between the limits of its vertical range of movement.

I have described in detail the structure and the operation of my improved toaster which permits conversion from a toaster wherein two conventionally sized bread slice receiving slots are provided to one wherein: (1) a single enlarged slot is provided, or (2) two slots of unequal width are provided. Along with this I have provided bread carriage structure in each of the slots which is capable of automatically adapting itself to the size of its associated slot. As will be evident from the foregoing description, certain aspects of my invention are not limited to the particular details of construction of the example illustrated, and I contemplate that various and other modifications will occur to those skilled in the art. It is therefore my intention that the appended claims shall cover such modifications and applications as do not depart from the true spirit and scope of my invention.

What I claim as new and desire to secure by Letters Patent of the United States is:

1. A cooking device having a cooking chamber, a dividing wall in said chamber that normally cooperates with said chamber to form two cooking spaces, a carriage in each space for supporting an object to be cooked, said wall being mounted in said chamber so as to be movable from its normal position to a position wherein said wall is laterally displaced to one side of said cooking chamber and thereby cooperates with said chamber to form a single enlarged cooking space, one of said carriages being collapsible and the other being expandible, each of said carriages being adapted to automatically adjust itself in response to movement of said wall to the size of the cooking space in which it is disposed, and means for moving said wall.

2. A cooking device as defined in claim 1 wherein said means is adapted to move said wall to any position within the limits of said wall's range of movement and thereby provide two cooking spaces of unequal size, and each of said carriages is adapted to automatically adjust itself to the size of the cooking space in which it is disposed.

3. A cooking device having a cooking chamber, said chamber comprising spaced end walls, heating elements on each side between the end walls, a dividing wall normally positioned centrally of said chamber, said wall being parallel to said heating elements and located between said end walls to thereby form two cooking spaces in the chamber, said dividing wall being movable in said chamber from its normal position toward one heating element to a position wherein it is displaced completely to one side of the chamber to thereby cooperate with said chamber to form a single enlarged cooking space, a lower and upper slot in each end wall, an elongated rod movably carried by said chamber, a first link adjacent to each end wall having one of its ends secured to said rod and the other end connected to said dividing wall by means that pass through one of the slots, a second link adjacent to each end wall and pivotally secured to its associated end wall at one of its ends and operatively connected to said dividing wall by means that pass through the other of said slots, the adjacent links at each end wall being operatively connected to each other, and means for moving said links and thereby moving the dividing wall relative to said chamber.

4. A cooking device as defined in claim 3 wherein said rod is positioned beneath said chamber, and the other ends of the first links pass through the upper slots.

5. A cooking device as defined in claim 3 wherein said moving means comprises a linkage and lever system including a manual control lever that is accessible from the exterior of the cooking device.

6. A cooking device having a cooking chamber, said chamber comprising end walls, heating elements on each side between the end walls, a dividing wall normally positioned centrally of said chamber parallel to said heating elements and between the end walls to form two cooking spaces in the chamber, a carriage in each cooking space for supporting an object to be cooked, said dividing wall being laterally movable in said chamber from its normal position to a position wherein it is displaced completely to one side of said chamber and thereby cooperates with said chamber to form a single enlarged cooking space, said dividing wall having a heating element positioned on each lateral face thereof, one of said carriages being collapsible and the other being expandible, said carriages having portions operatively connected to said dividing wall whereby movement of said dividing wall causes the carriages to automatically adjust themselves to the size of the cooking spaces in which they are disposed, and means for moving said dividing wall.

7. A cooking device as defined in claim 6 wherein each of said carriages comprises two parts, one of the parts of each carriage being fixed in a horizontal plane relative to the other part, and the other part of each carriage being connected to said dividing wall and movable therewith.

8. A cooking device as defined in claim 7 wherein the parts of each of said carriages are pivotally connected to each other.

9. A cooking device as defined in claim 6 wherein said dividing wall has a guard positioned on each side thereof, said guard having vertically extending portions, and wherein each of said carriages comprises two parts, one part being fixed in a horizontal plane relative to the other part, and the other part being slidably mounted on said vertically extending portions and being movable with said walls.

10. A cooking device as defined in claim 9 wherein the parts of each of said carriages are pivotally connected to each other.

11. A cooking device as defined in claim 6 wherein said means is adapted to move said wall to any position between the limits of said wall's range of movement to thereby provide two cooking spaces of unequal size, and each of said carriages is adapted to automatically adjust itself to the size of the cooking space in which it is disposed.

12. A cooking device as defined in claim 6 wherein said means for moving said wall comprises a rod movably carried by said chamber, a first link adjacent to each end wall and having one of its ends secured to said rod, the other end of said link being connected to said dividing wall by means that pass through its associated end wall, a second link adjacent to each end wall and pivotally secured to its associated end wall at one of its ends, said second link being operatively connected to said dividing wall by means that pass through its associated end wall, the adjacent links at each end wall being operatively connected to each other, and means for moving said links.

13. A cooking device as defined in claim 12 wherein said means for moving said links comprise a linkage and lever system that is accessible from the exterior of the cooking device.

14. A cooking device comprising a cooking chamber, means for heating said chamber, a dividing wall normally positioned centrally of said chamber to form two cooking spaces in the chamber, a carriage in each cooking space for supporting an object to be cooked, said wall being movable to a position wherein it is displaced completely to one side of said chamber and thereby cooperates with said chamber to form a single enlarged cooking space, one of said carriages being collapsible and the other expandible, said carriages having portions operatively connected to said wall whereby movement of said wall causes the carriages to automatically adjust themselves to the size of the cooking spaces in which they are disposed, and means for moving said wall.

15. A cooking device as defined in claim 14 wherein said moving means comprises a rod movably carried by said chamber, said chamber having parallel end walls, a first link adjacent to each end wall and having one of its ends secured to said rod, the other end of said link being connected to said dividing wall by means that pass through its associated end wall, a second link adjacent to each end wall and pivotally secured to its associated end wall at one of its ends, said second link being operatively connected to said dividing wall by means that pass through its associated end wall, the adjacent links at each end wall being operatively connected to each other, and means for moving said links.

16. A cooking device as defined in claim 15 wherein said means for moving said links comprise a linkage and lever system that is accessible from the exterior of the cooking device.

17. A cooking device as defined in claim 14 wherein said moving means is adapted to move said wall to any position between the limits of said wall's range of movement to thereby provide two cooking spaces of unequal size.

18. A toaster comprising a casing having a toasting chamber formed therein, said casing including a top wall having an opening therein of substantially the same size as said chamber and which allows access to said chamber, means for heating said chamber, means for supporting objects to be toasted in said chamber, a dividing wall in said chamber which normally cooperates with said chamber to form two toasting spaces which are accessible through said opening, said dividing wall being mounted in said chamber so as to be movable from its normal position to a position wherein it is laterally displaced to one side of said chamber and thereby cooperates with said chamber to form a single enlarged toasting space that is accessible through said opening, and mechanism for moving said dividing wall to any position within the limits of said dividing wall's range of movement to thereby permit adjustment of said toaster so as to have either a single enlarged toasting space, two equal toasting spaces or two toasting spaces of unequal size, said mechanism comprising a system of levers and linkages that are operatively connected to said dividing wall, said system being accessible from the exterior of said chamber and manually actuable, and said system being adapted to translate manual actuating motion to lateral movement of said dividing wall.

References Cited in the file of this patent

UNITED STATES PATENTS

| | | |
|---|---|---|
| 1,113,473 | Noreck | Oct. 13, 1914 |
| 1,948,739 | Wolcott et al. | Feb. 27, 1934 |
| 2,108,778 | Morgan | Feb. 15, 1938 |
| 2,313,968 | Reich | Mar. 16, 1943 |
| 2,489,500 | Pulliam | Nov. 29, 1949 |